US005330608A

United States Patent [19]

Kemmler et al.

[11] Patent Number: 5,330,608

[45] Date of Patent: Jul. 19, 1994

[54] APPARATUS FOR WRAPPING FLEXIBLE, ELONGATE OBJECTS

[75] Inventors: Heinrich Kemmler, Hauneck; Heinrich Will, Haunetal, both of Fed. Rep. of Germany

[73] Assignee: Wella Aktiengesellschaft, Darmstadt, Fed. Rep. of Germany

[21] Appl. No.: 80,563

[22] Filed: Jun. 21, 1993

Related U.S. Application Data

[63] Continuation-in-part of Ser. No. 699,460, May 13, 1992, abandoned, which is a continuation-in-part of Ser. No. 294,608, Nov. 30, 1988, abandoned.

[30] Foreign Application Priority Data

Apr. 1, 1987 [DE] Fed. Rep. of Germany ....... 3710938

[51] Int. Cl.⁵ ........................ B32B 31/00; G05G 1/00

[52] U.S. Cl. .................................... 156/361; 156/425; 156/351; 57/3; 242/7.08

[58] Field of Search ............... 156/391, 392, 361, 368, 156/378, 379, 425, 428, 429, 361, 350, 351; 158/292; 242/701, 7.02, 7.08, 7.19, 7.22, 7.23; 57/3, 19

[56] References Cited

U.S. PATENT DOCUMENTS 2,238,727 4/1939 Glassford ............................ 57/18 X
2,279,563 4/1942 Dye .................................. 73/866 X
2,998,692 9/1961 Garner ................................. 57/3 X
3,000,167 9/1961 Pierce ................................... 57/3 X
3,519,519 7/1970 Basso ............................. 156/430 X
3,756,004 9/1973 Gore .............................. 156/425 X
4,145,740 3/1979 McClean ......................... 156/425 X
4,251,036 2/1981 McLain ........................... 156/425 X
4,463,547 8/1984 Young ................................. 57/6 X
4,982,560 1/1991 Vives ............................ 242/7.08 X

*Primary Examiner*—David A. Simmons
*Assistant Examiner*—Charles E. Rainwater
*Attorney, Agent, or Firm*—Michael J. Striker

[57] ABSTRACT

An apparatus for wrapping flexible elongate objects has a wrapping wheel arranged coaxially to a longitudinal axis of the objects and having a tape spool support movable therewith, drive mechanism with a roller drive for advancing the objects and arranged at one side of the wrapping wheel, and an electric program control for controlling a drive length by set point/control point comparison. The drive mechanism also includes a carriage movable parallel to an axis of rotation of the wrapping wheel and to the longitudinal axis of the objects, and includes a holding device on the wrapping wheel side for holding an end of an object for pulling the object through the wrapping wheel. The drive mechanism also includes two vertically displaceable rolls which for a start of the wrapping are positioned relative to one another so far that the holding device is movable between the rolls to the wrapping wheels. The rolls are arranged vertically one above the other and oriented with their axes of rotation transversely relative to the longitudinal axis of the objects. One roll functions as a length data detector and the other roll functions as a drive, the carriage is synchronized at least in part with the drive so that for wrapping in the region of advancement of the carriage the holding device holds the end of an object, and for passing the region the rolls take over a further drive of the object and thereby the holding device opens for releasing the end of the object.

11 Claims, 17 Drawing Sheets

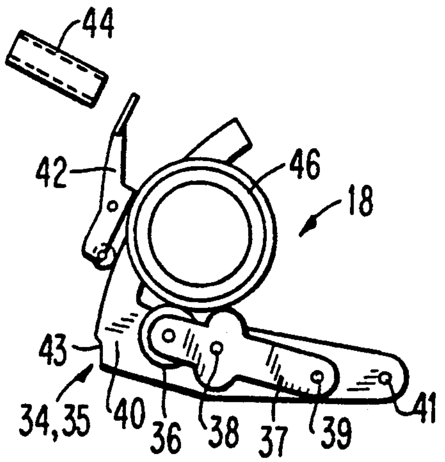
FIG. 10
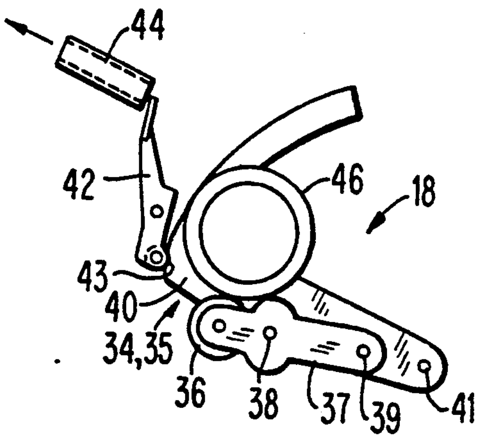
FIG. 11
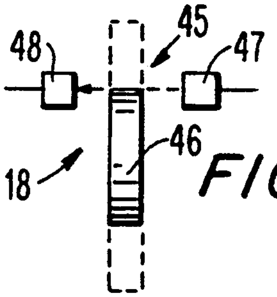
FIG. 12
FIG. 13
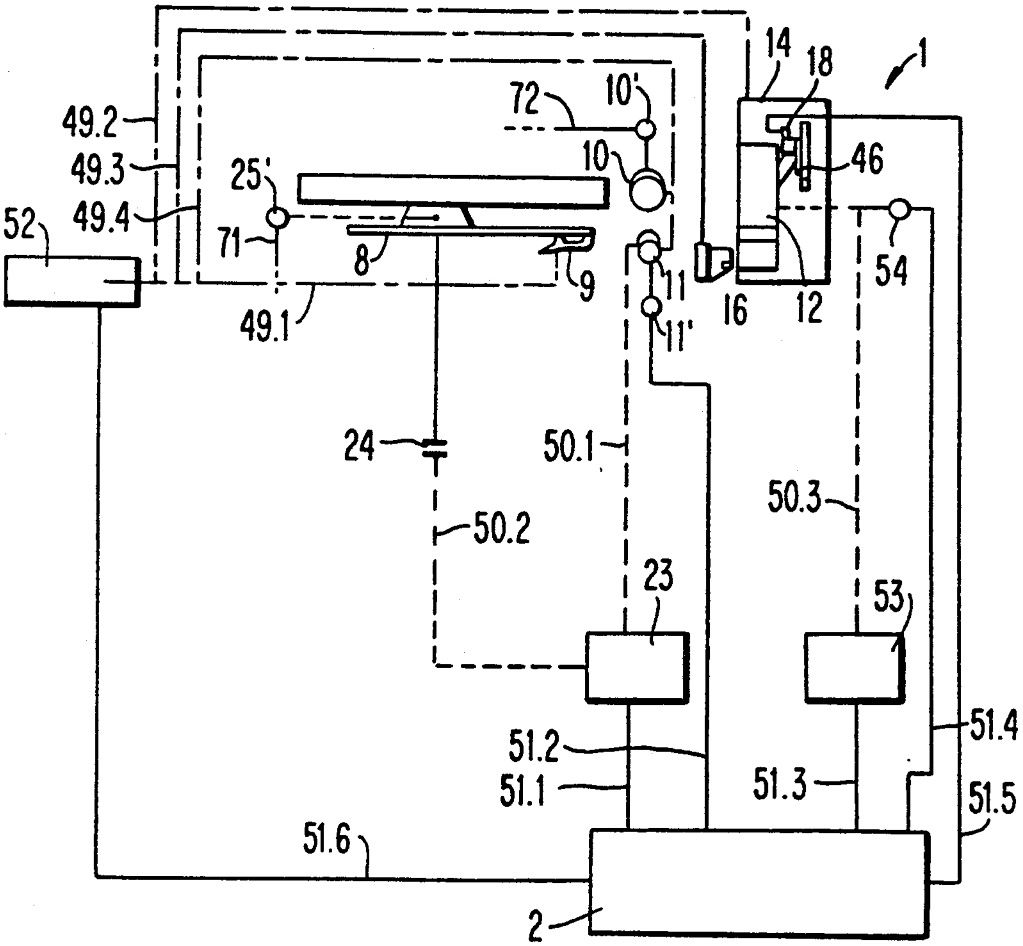

APPARATUS FOR WRAPPING FLEXIBLE, ELONGATE OBJECTS

CROSS-REFERENCE TO RELATED APPLICATIONS

This application is a continuation-in-part of application Ser. No. 699,460, filed May 13, 1992, now abandoned, which in turn is a continuation-in-part of U.S. patent application Ser. No. 294,608, filed on Nov. 30, 1988, now abandoned.

BACKGROUND OF THE INVENTION

The invention relates to an apparatus for wrapping flexible elongate objects and comprising an arrangement for advancing the objects and a wrapping wheel arranged coaxially to the longitudinal axis of the objects and provided with a tape spool support displaceable with the wrapping wheel.

A known apparatus of this type comprises a device for advancing the objects, wherein this device comprises a circulating chain for advancing objects, and the chain is provided with uniformly arranged gripping clamps for the objects to be wrapped up. Corresponding slides are provided for programming wrapping steps. The selection of wrapping steps is limited by the finite spatial expansion of the slides. For this reason, it is not possible to automatically wrap up the objects from the very beginning of the front end.

The Dye U.S. Pat. No. 2,279,563 shows an apparatus in which, for holding the cable end a holding device 9 in form of a clamp is provided. For wrapping up the clamp 20 rotates thereby the cable or wire 21 entrained in rotation. Moreover, the maximum possible wrapping length is very limited, since it is determined by the length of the track way 6. Furthermore, the quality of the wrapping is not constant or in other words with increased wrapping length it is worse due to increasing torsion. The pulling tension of the band is thereby always weaker and the individual cable is additionally wrapped in a disadvantageous manner.

The Glassford U.S. Pat. No. 2,238,727 discloses an apparatus in which the maximum wrapping length is limited by the length of the chain 70. In Glassford the wheels or rollers 114,116 serve only as tension holding devices and do not have any drive. Moreover, the rollers 114, 116 are arranged before the wrapping wheel as considered in the pulling direction of the wire.

The Garner U.S. Pat. No. 2,998,692 discloses an apparatus which provides wrapping of wires with unlimited length of a caterpillar-type. This apparatus is however not suitable for short wrapping lengths and especially for cable trees.

The Pierce U.S. Pat. No. 3,000,167 discloses an apparatus which is similar to the apparatus of Garner. This apparatus is however not suitable for short wrapping lengths and especially for cable trees.

The Basso U.S. Pat. No. 3,519,519 shows a similar apparatus as Glassford. In the patent to Basso the maximum wrapping length is limited by the periphery of the drum 52 as shown in FIG. 1. An unlimited wrapping or in other words long wrapping length is not possible and is not suitable for wrapping of cable trees.

The Young U.S. Pat. No. 4,463,547 discloses an apparatus which is similar to the apparatus of Garner. This apparatus is also not suitable for short wrapping lengths and especially for cable trees.

SUMMARY OF THE INVENTION

The object of the invention is to provide an apparatus which does not have the aforementioned disadvantages, makes it possible to effect wrapping in a simple manner in desired wrapping steps and wrapping lengths, requires short set-up times, and has a high accuracy of reproduction in wrapping.

The object of the invention is achieved by providing a feed arrangement with a feed carriage movable parallel to the axis of rotation of the wrapping wheel and to the longitudinal axis of the objects, respectively. The feed carriage comprises a holding device for the front end of the objects on the wrapping wheel side. The feed arrangement comprises two vertically displaceable rolls arranged vertically one above the other and oriented with their axes of rotation transversely relative to the longitudinal axis of the objects. One roll is a feed-length data detector, and the other roll functions as a feed drive. The feed carriage is synchronized in part or in its entirety with the feed drive. An electric program control controls the feed length by set point/control point comparison.

The apparatus in accordance with the present invention provides for a substantially short and unlimited wrapping length. In accordance with the present invention the apparatus on the one hand has a holding device on the carriage for short wrapping lengths especially for wrapping with the start in the region of the cable end, and on the other hand it has a roller drive with rollers for unlimited wrapping lengths.

Each wrapping up process starts with clamping the cable end in the holding device and then wrapping up to the maximum displacement length of the carriage. If the wrapping extends beyond the region of the maximum displacement length of the carriage the roller drive takes up the further transportation of the cable and simultaneously the cable end is released by the holding device.

A particularly advantageous area of use of the invention is programmed wrapping of flexible cable strands to form cable harnesses. A programmable wrapping is made possible by simple manipulation of the apparatus.

In an advantageous manner, the objects are prevented from twisting during wrapping by means of the rolls which are arranged vertically one above the other in the vicinity of the winding wheel, wherein one roll is constructed as a feed-length data detector and the other roll is constructed as a feed drive.

In order to overcome the final forward feed region of the feed carriage, the roll feed drive takes over the continued feed of the objects shortly before the end of the feed carriage path is reached, wherein the front end of the objects is disengaged from the holding device by means of a control.

A tape supply control apparatus ensures that the wrapping process is halted when a determined minimum tape spool diameter is reached, so that the binding can be continued without interruption by installing a new tape spool.

The minimum diameter of the tape spool can also be controlled by means of a lever mechanism, as well as by means of a light barrier.

Another advantage consists in that the apparatus comprises a tape cutting apparatus which automatically cuts the tape after the end of the programmed wrapping process or when a minimum tape roll diameter is reached.

The tape can be cut in a particularly precise manner in that the tape cutting apparatus is provided with a rotatable cuter which is oriented vertically relative to the tape.

The apparatus can be re-equipped for a different wrapping program in a very short time by means of an electric program control and corresponding software. All moving parts of the apparatus can accordingly also be reprogrammed for a set purpose and logically connected with one another within a very short time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 10 and 11 show a lever-mechanism tape supply control apparatus;

FIG. 12 shows a light-barrier tape supply control apparatus;

FIG. 13 shows a block wiring diagram for connection of members of the apparatus with the program control;

DESCRIPTION OF THE PREFERRED EMBODIMENTS

Figure 1:
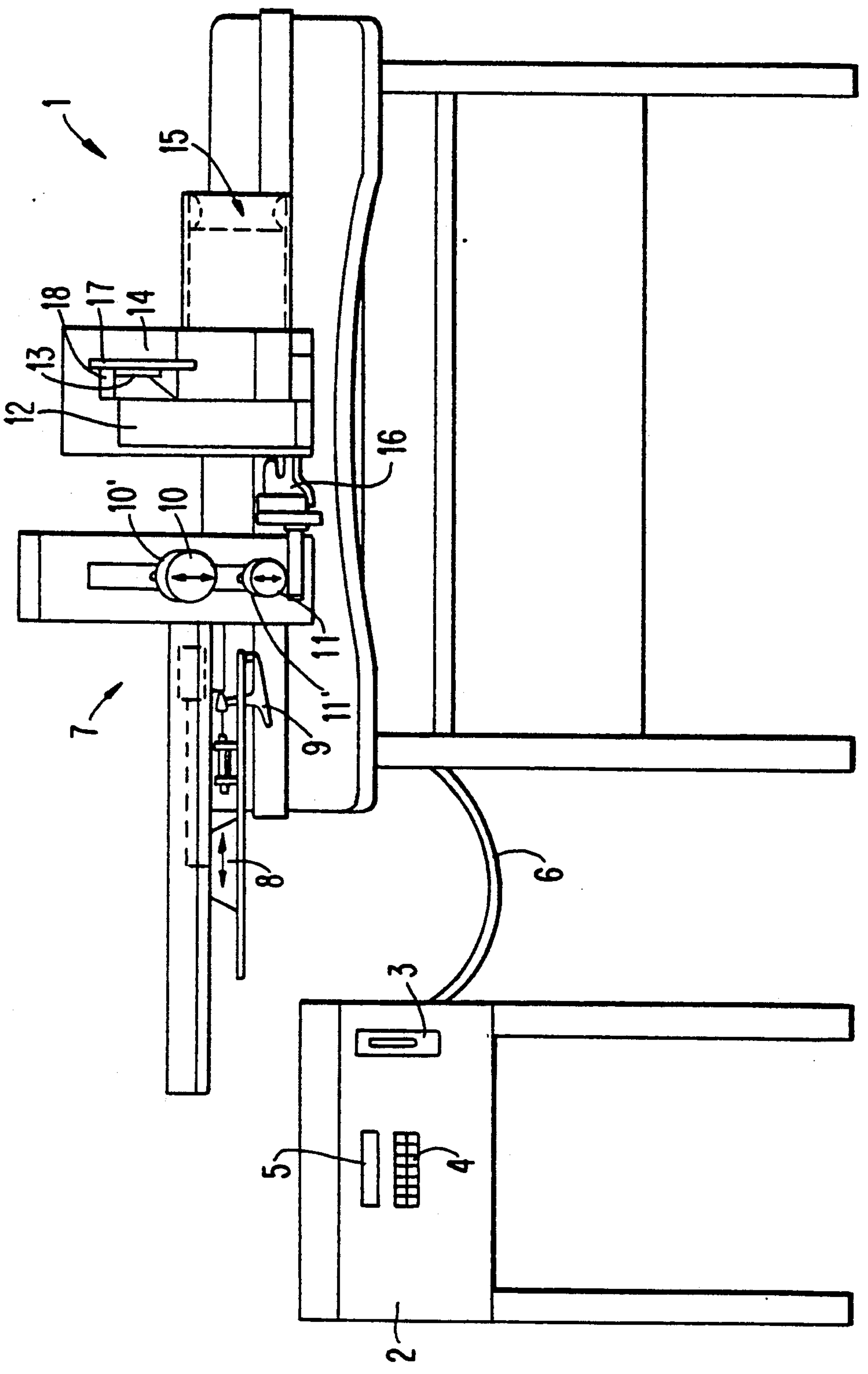
FIG. 1 shows a front view of the apparatus according to the present invention and including the program control.

FIG. 1 shows an apparatus 1 with an electronic program control 2. The electronic program control comprises a diskette drive 3, an input keyboard 4, and a display 5, and is connected by conductors 6 with various drive members of the apparatus 1. The apparatus 1 comprises a feed arrangement 7 comprising a feed carriage 8 with a holding device 9 for holding elongate objects and two rolls 10, 11 which are arranged vertically one above the other, can be relocated in a vertical direction and are oriented with their axes of rotation transversely relative to the longitudinal axis of the objects. One roll 10 is provided as feed-length data detector 10' in a form of an electric speed generator, and the other roll 11 is provided as feed drive 11'. The feed carriage 8 is movable parallel to the axis of rotation of a wrapping wheel and to the longitudinal axis of the objects, respectively. A wrapping wheel 12 is arranged at the right-hand side next to the rolls 10, 11 and is provided with a tape spool support 13 movable with it. A safety cover 14 encloses the wrapping wheel 12. A feed duct 15 for feeding elongate objects is arranged on the right-hand side next to the wrapping wheel 12. A tape cutting apparatus 16, which cuts the tape in the vicinity of the elongate objects at the end of the binding process or at the end of the tape supply 17, is arranged between the rolls 10, 11 and the wrapping wheel 12. A tape supply control apparatus is provided at the tape spool support 14 and serves to automatically terminate the wrapping process promptly before the end of the tape supply 17, so that the wrapping process can continue according to the program with a new tape supply 17.

Figure 2:
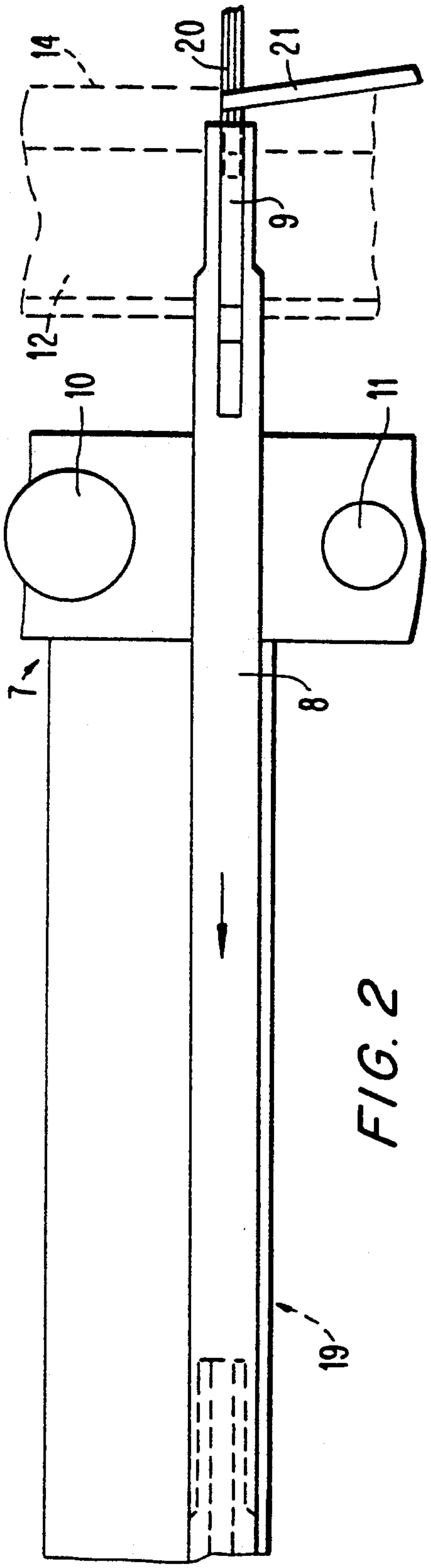
FIGS. 2 and 3 show side and top views, respectively, of a feed arrangement in an initial binding position.
Figure 3:
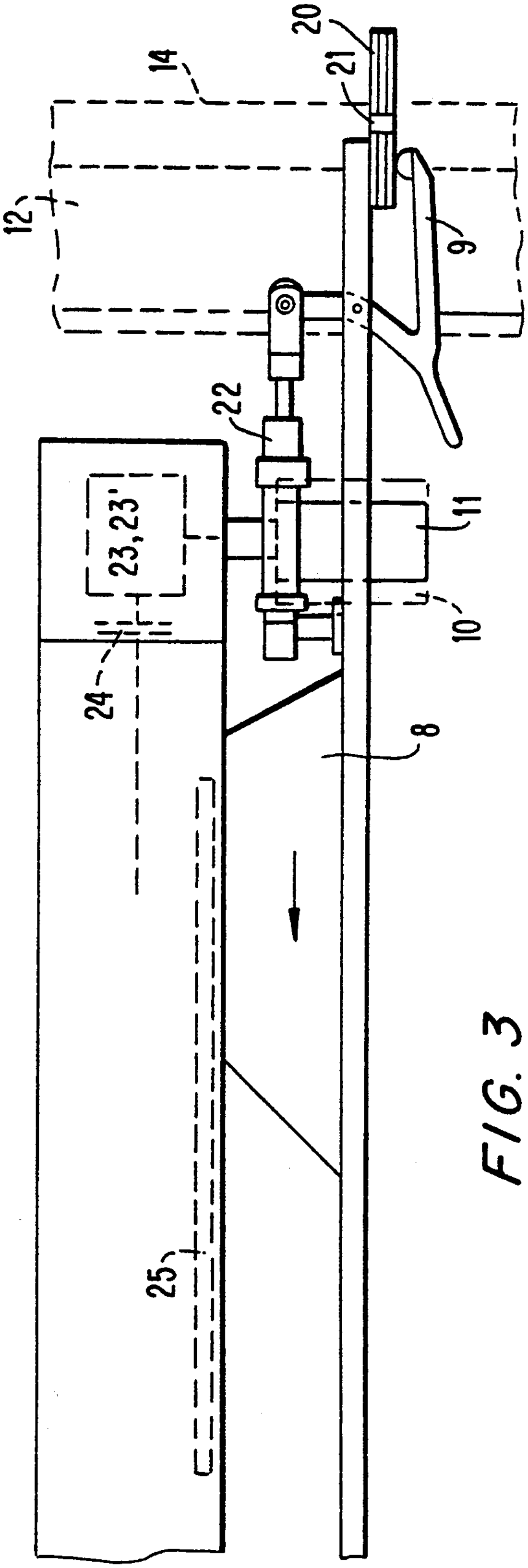

FIG. 2 shows a side view of the feed arrangement 7 in an initial wrapping position. The feed carriage 8 is moved into the winding wheel 12 from its left-hand rest position 19 shown in a broken line, with the holding device 9 which secures the front end of the objects 20 to be wrapped up. A tape 21 which is adhesive on one side is particularly suitable for wrapping. In this starting position, the rolls 10, 11 are spaced far enough apart so as not to impede movement of the feed carriage 8 into the starting position. FIG. 3 shows a top view of the feed arrangement 7 according to FIG. 2. For programmed holding of the objects 20 by means of the holding device 9, the latter is operatively connected with a controllable actuating cylinder 22 which controls the operation of the holding device 9. As indicated with dashes, the roll 11 is connected with a motor 23. The feed carriage 8 is connected with the motor 23 via a controllable coupling 24. The motor 23 can serve at the same time as a displacement pickup drive 23'. In order to monitor and measure the preset displacement, the feed carriage 8 can be provided with a digitized displacement length scale 25 which is connected with the control 2 by means of the optical sensor.

After the feed carriage 8 with the objects 20 is moved out of the range of the two rolls 10, 11 and the winding wheel 12, the two rolls 10, 11 move together in such a way that they contact the elongate objects 20, the roll 10 acts as a feed length data detector 10', and the roll 11 acts as a feed drive 11. This position is shown in FIG. 4, wherein the two rolls 10, 11 and the feed drive 11', respectively, move toward the left in the direction of the arrow 26 at the forward feed velocity in a synchronized manner with the feed carriage 8.

Figure 4:
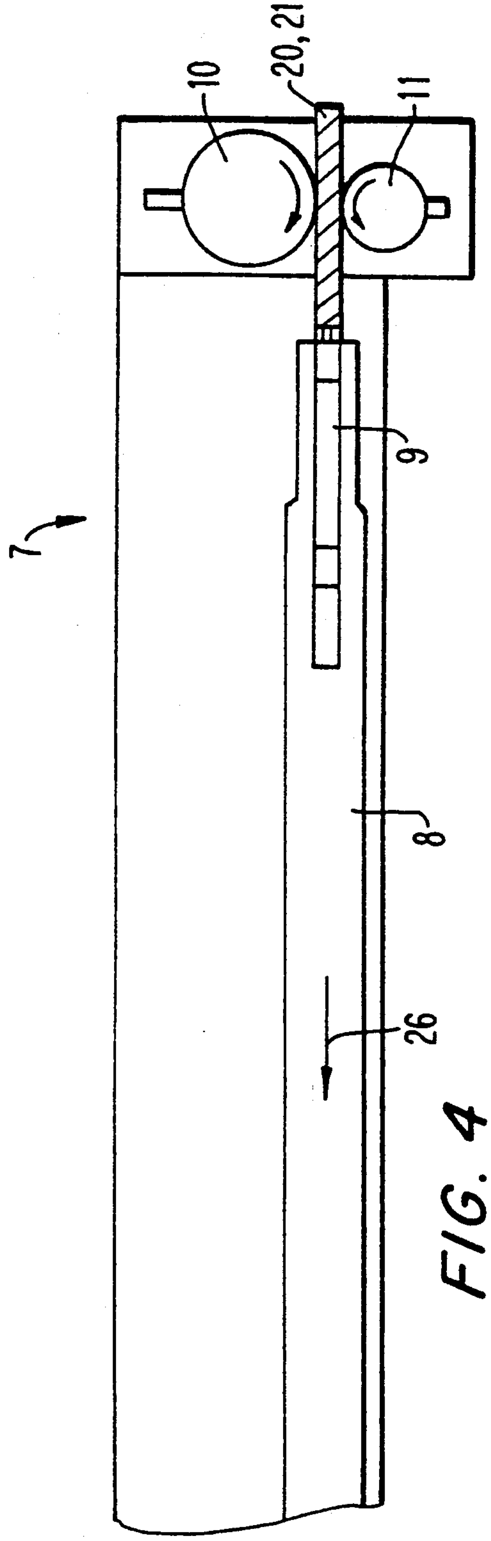
FIGS. 4 to 7 show the feed arrangement with an activated roll feed drive.
Figure 5:
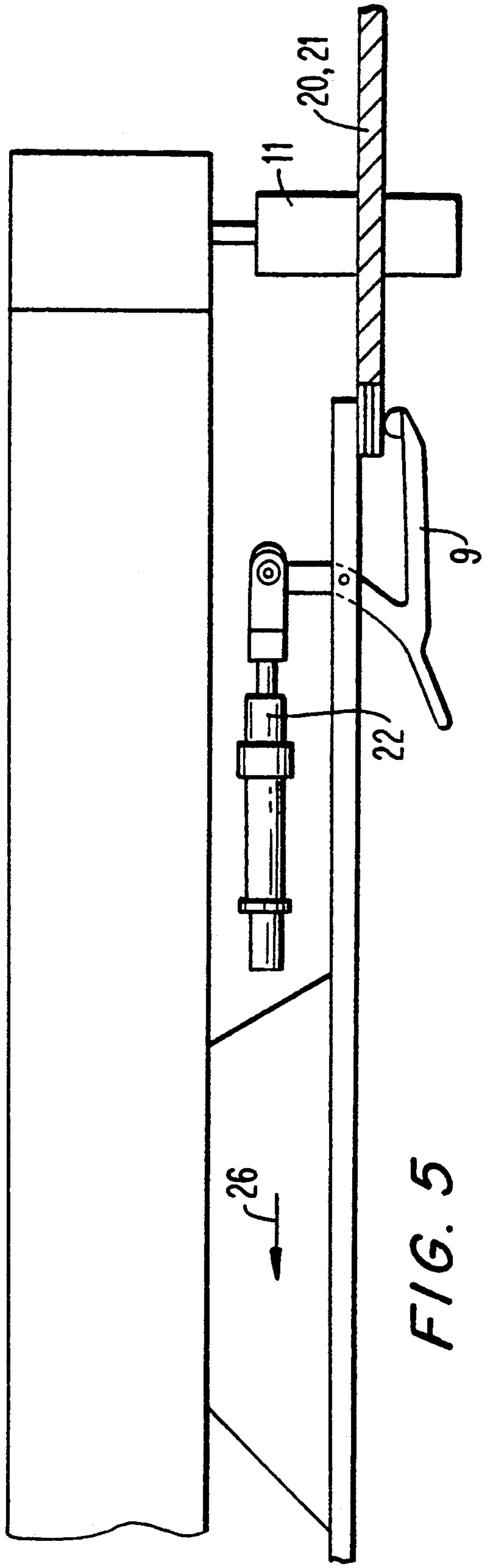

A top view of the feed arrangement 7, according to FIG. 4 is shown in FIG. 5.

If the maximum displacement distance of the feed carriage 8 is reached without the wrapped up length of the objects 20 being achieved, the holding apparatus 9 is disengaged from the lifting cylinder 22 according to the program, so that the objects 20 fall downward and the feed drive 11' now takes over the forward feed of the objects 20 by itself. This position is shown in FIG. 6.

Figure 6:
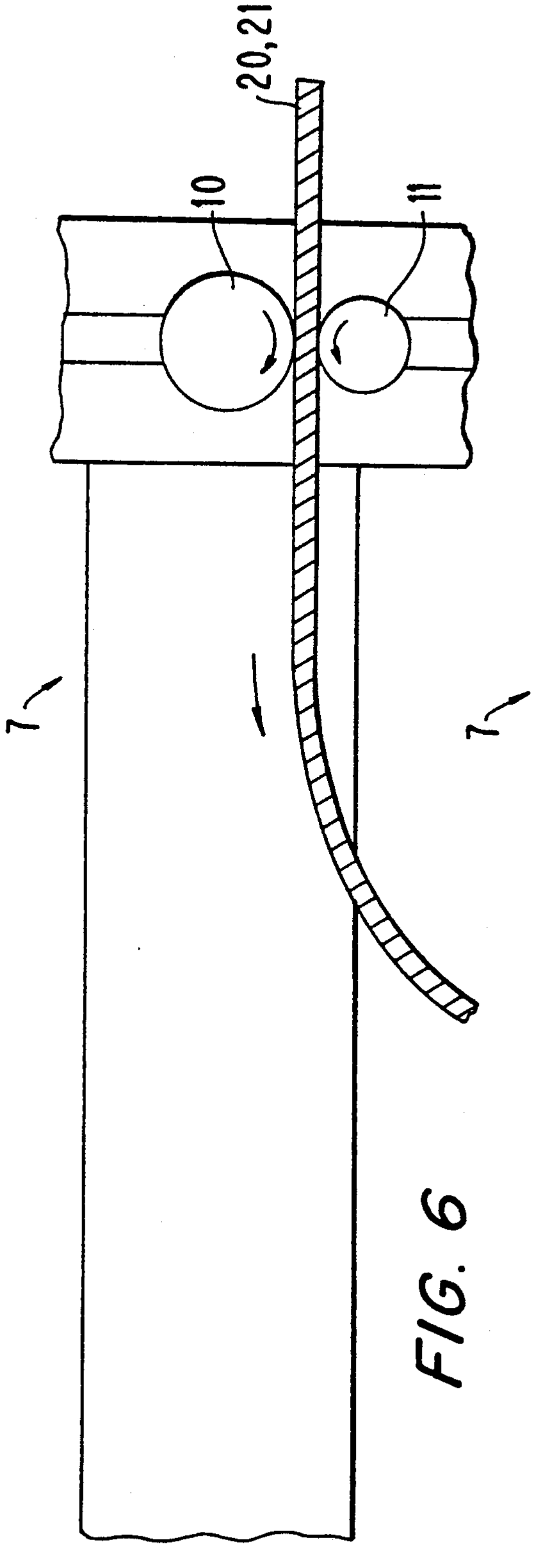
Figure 7:
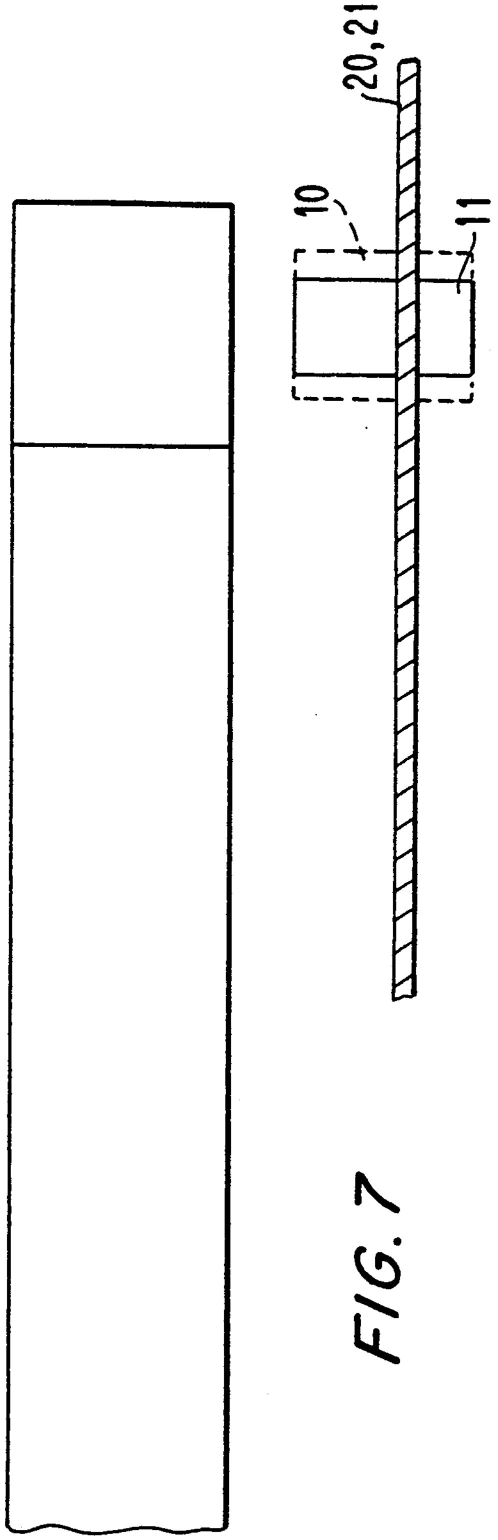

A top view of the feed arrangement 7, according to FIG. 6, is shown in FIG. 7.

Figure 8:
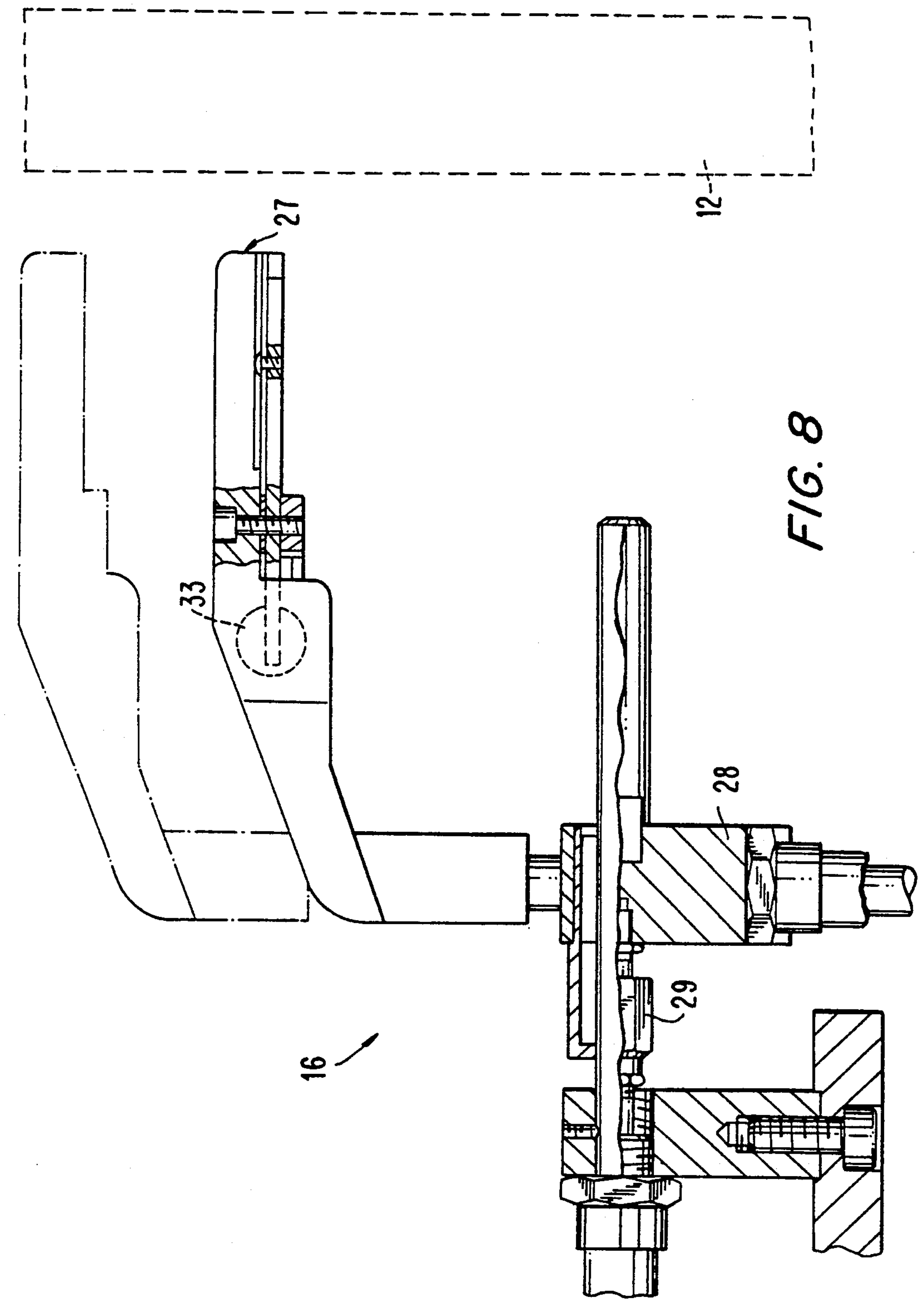
FIGS. 8 and 9 show a tape cutting apparatus.
Figure 9:
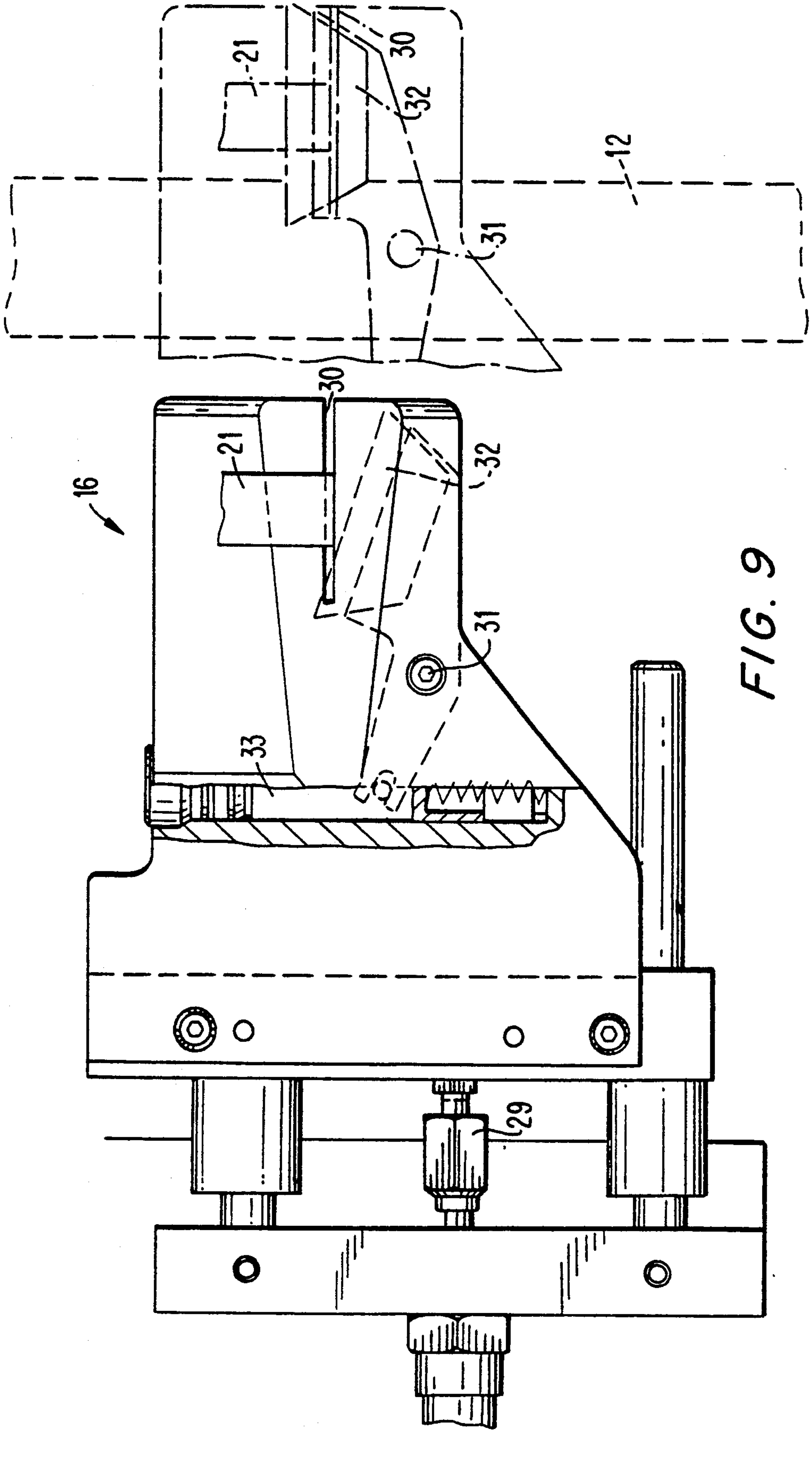

FIGS. 8 and 9 shows a pneumatically operated tape cutting apparatus 16 which is located in a passive position (FIG. 9) outside the wrapping wheel 12. This position 27 is shown in FIG. 8. In order to cut the binding tape 21, the tape cutting apparatus 16 is brought into the position shown in dash lines by means of the piston cylinder 28. A top view of this position is shown in FIG. 8. The tape cutting apparatus 16 is then brought further into the position shown in dash lines via the piston cylinder 29. The tape 21 is located in a slot 30 in which a cutter 32 is arranged vertically relative to the tape 21 and is rotatable by means of an axle 31 and drivable by a piston cylinder 33. A more reliable cutting of the tape 1 is achieved by rotating the cutter 32 around the axle 31. When the cut is terminated, the tape cutting apparatus 16 is brought into the passive position 27 (FIG. 8) by the control 2 in the opposite sequence.

FIGS. 10 and 11 show a tape supply control apparatus 18 with a device 34 which detects the minimum tape roll diameter and stops the wrapping process via a lever mechanism 35 when a preset minimum diameter is reached. The tape roll diameter is sensed by a roll 36, and, depending on the tape roll diameter, a lever 37 is moved via the stationary axle 38, so that a lever 40 is swiveled via the stationary axle 41, according to FIG. 11, via an axle 39, so that a sensing lever 42 moves into a recess 43 at a preset minimum diameter and with its other end activates an approach switch 44 which in turn terminate the wrapping process via the control 2. A contactless tape supply control apparatus 18 comprises a light transmitter 47 arranged on one side of the tape roll 46 and a light receiver 48, which functions as an approach switch 44 and is arranged on the other side of the tape roll 46 defining a light barrier 45.

A block wiring diagram for the control of the apparatus 1 is shown in FIG. 13, the dash/dot line show compressed air lines 49, the dashed line show mechanical drives 50, and the solid lines show control and single paths 51, respectively. A compressed-air generator 52, motors 23, 53 and the tape supply control apparatus 18 are connected in logical connection from the program control 2. In addition, a rotary transmitter 54 is provided which synchronizes the preset rate of rotation of the wrapping wheel 12 with the feed arrangement 7 via the motor 23 by means of a displacement distance scale data detector 25' and the feed-length data detector 10'.

Figure 21:
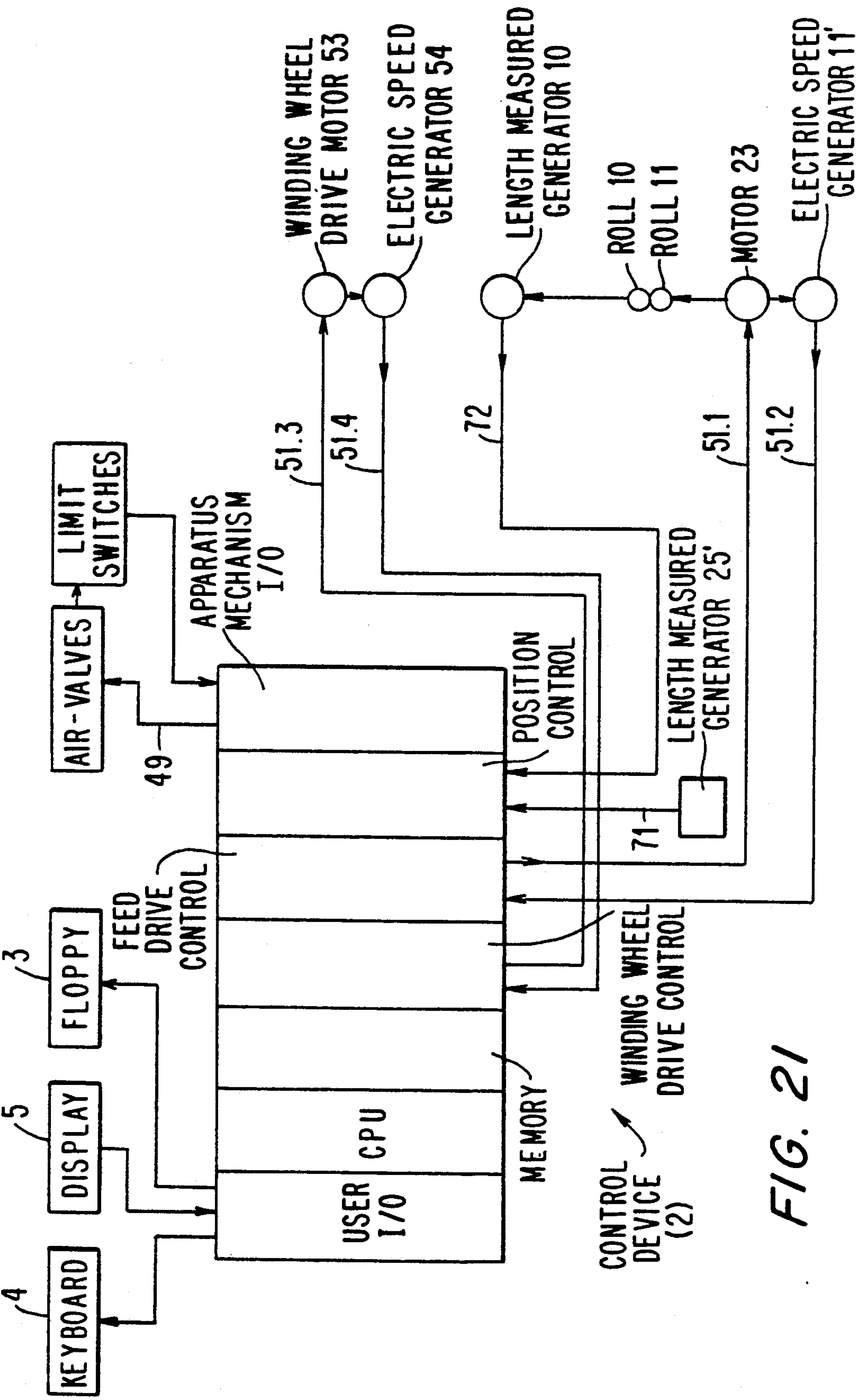
FIGS. 21–36 illustrate the operation of the apparatus according to the invention.
Figure 22:
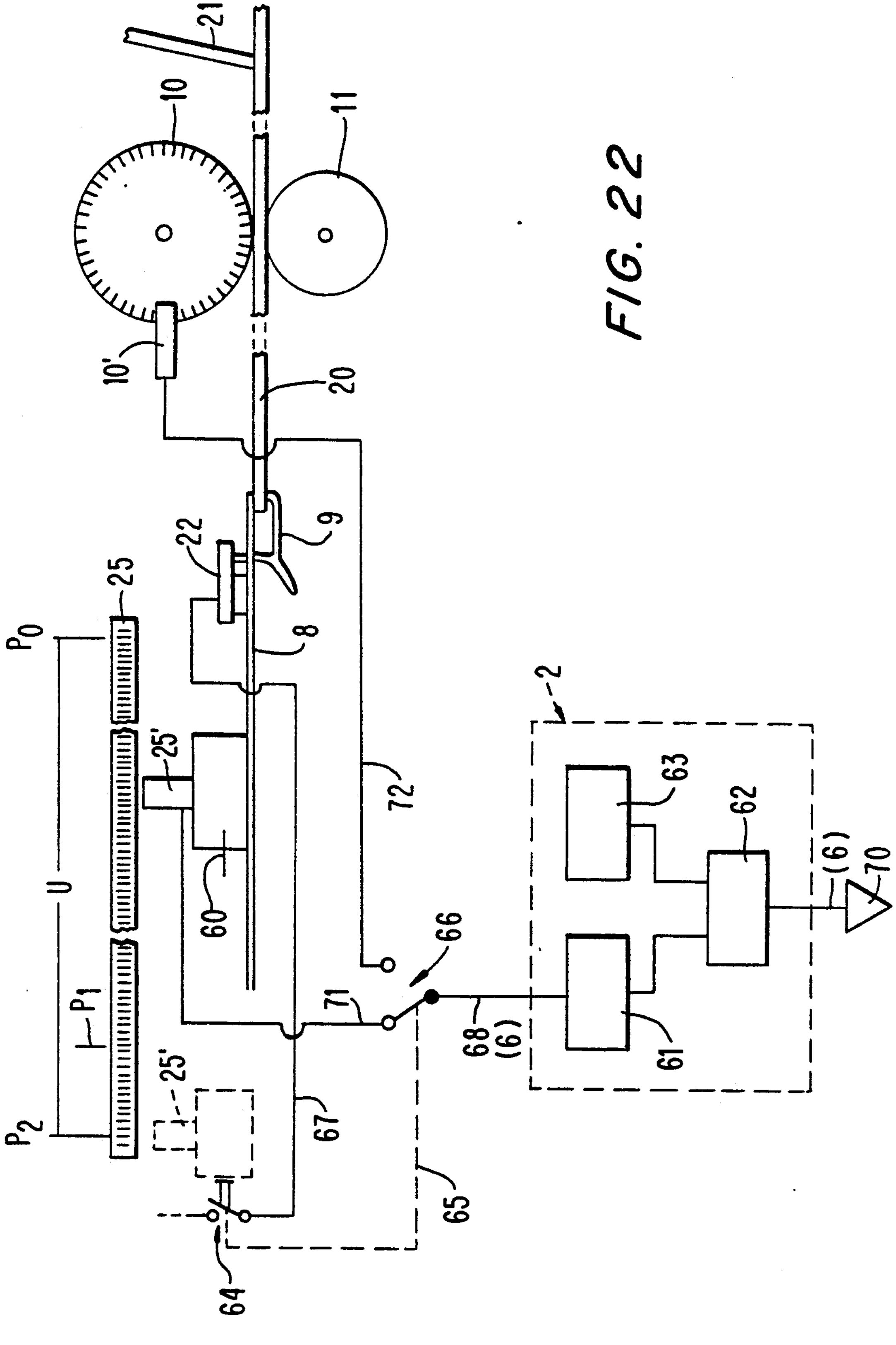

In FIG. 13 the motor 23 is controlled by the program control 2 through a conductor 51.1. The lower roller 11 is connected through an axle 50.1 with the motor 23 and with an electric speed generator 11', and the conductor 51.2 electrically connected the generator 11' with the program control 2. Thereby a predetermined rotary speed of the roller 11 is controlled and maintained constant. The opposite, upper roller 10 is axially connected with a length measuring generator 10' and is electrically connected through a conductor 72 with the program control 2 as shown in FIGS. 21 and 22. Thereby on the one hand a length measurement is possible through the roller 10 and on the other hand it is possible through the carriage 8 by means of a length measuring generator 25' which is electrically connected by a conductor 71 (see also FIG. 22) with a program control 2. The carriage 8 is driven by a controllable coupling 24 with an axle 50.2 of the motor 23.

The winding wheel 12 is driven by an axle 50.3 of a motor 53 which is controlled from the program control 2 through a conductor 51.3. The axle 50.3 is associated with a speed generator 54 which is electrically connected through a conductor 51.4 with a program control 2. Thereby the predetermined rotary speed of the winding wheel 12 is controlled and maintained constant. A conductor 51' leads from the tape supply control device 18 to the program control 2.

The program control 2 is connected by several conductors 51.6 with the compressed air generator 52 so that the holding device 9 is controlled through the compressed air conductors 49.1, the safety cover 14 is controlled through the conduit 49.2, the tape cutting apparatus 16 is controlled through the conductors 49.3, and both rollers 10, 11 are controlled through the conductors 49.4. Rollers 10, 11 are positionable in accordance with direction of the arrow in FIG. 1.

Figure 14:
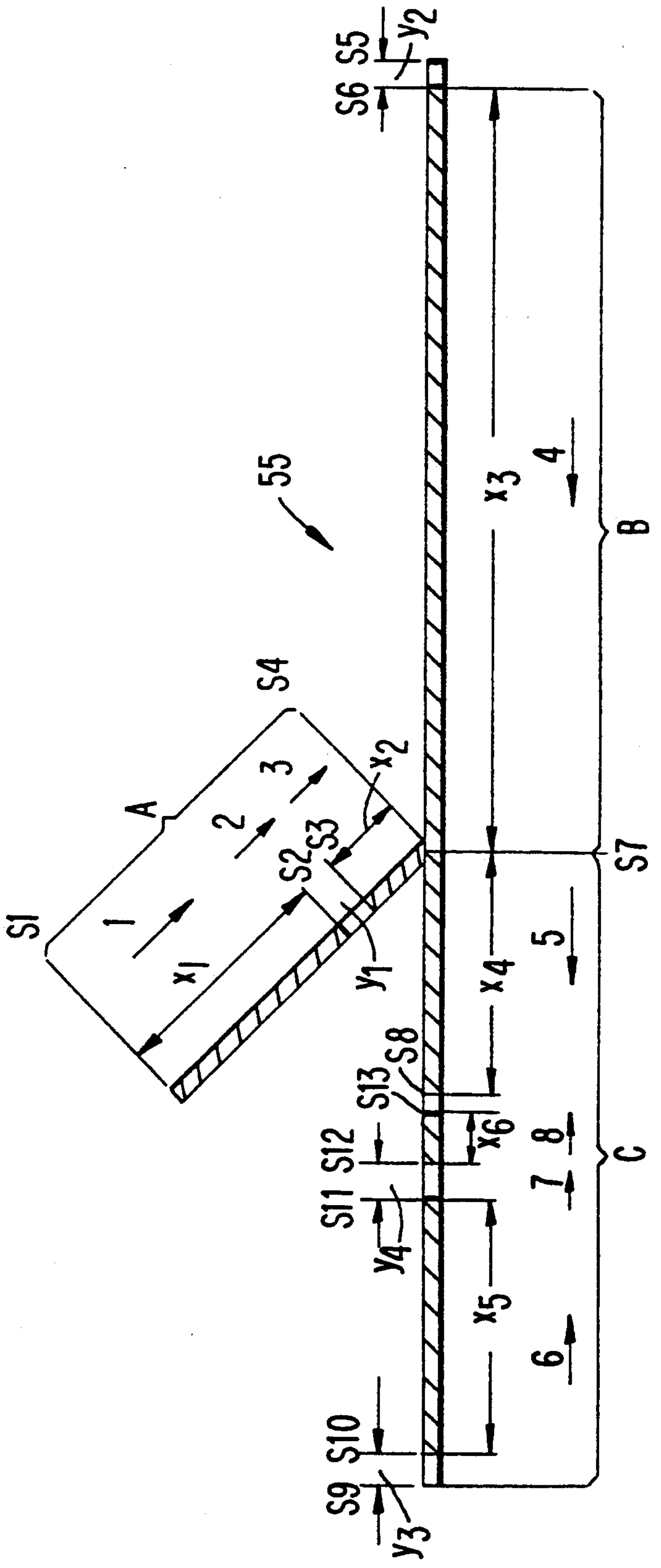
FIG. 14 shows a cable harness produced with the apparatus.
Figure 16:
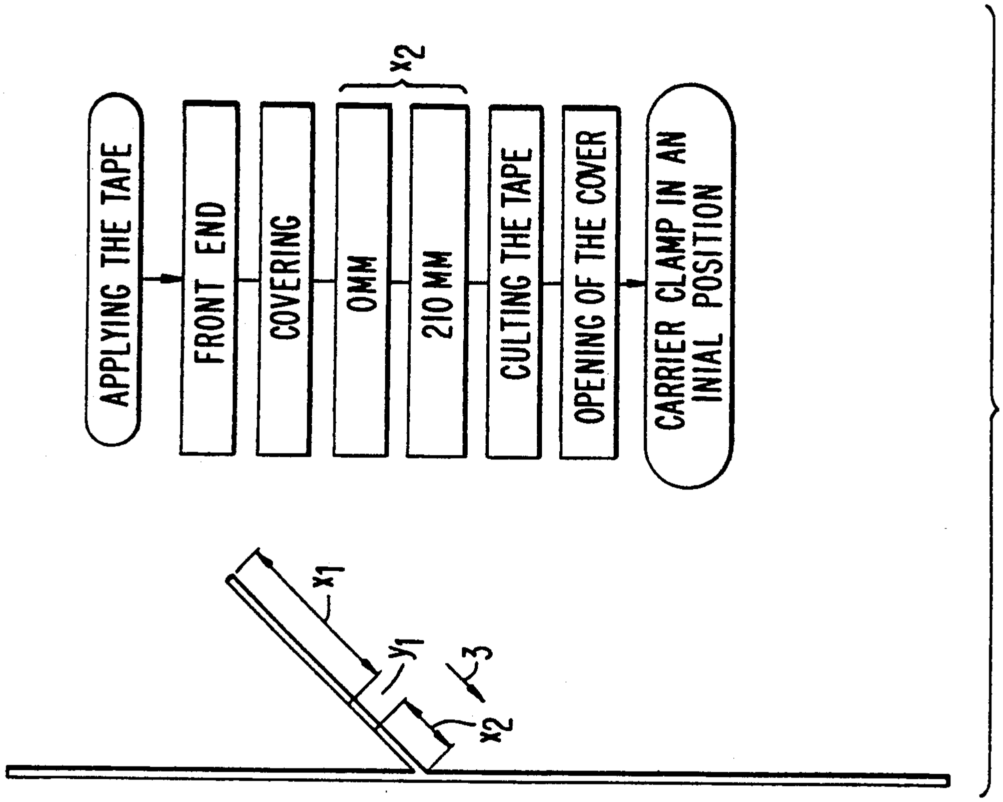
FIGS. 15 to 20 show various binding steps for the production of the cable harness according to FIG. 14.

The wrapping process is explained in more detail by way of the example of a cable harness 55 which is to be bound, according to FIG. 14.

The arrows provided with numbers show the sequence and direction of the wrapping process. The values $x_1$ to $x_6$ show the respective wrapped up length; the lengths which are not to be bound are represented by $y_1$ to $y_4$.

FIGS. 15 to 20 illustrate the individual manual and programmed work steps, wherein the rectangular boxes indicate the programming by way of the display 5.

Figure 15:
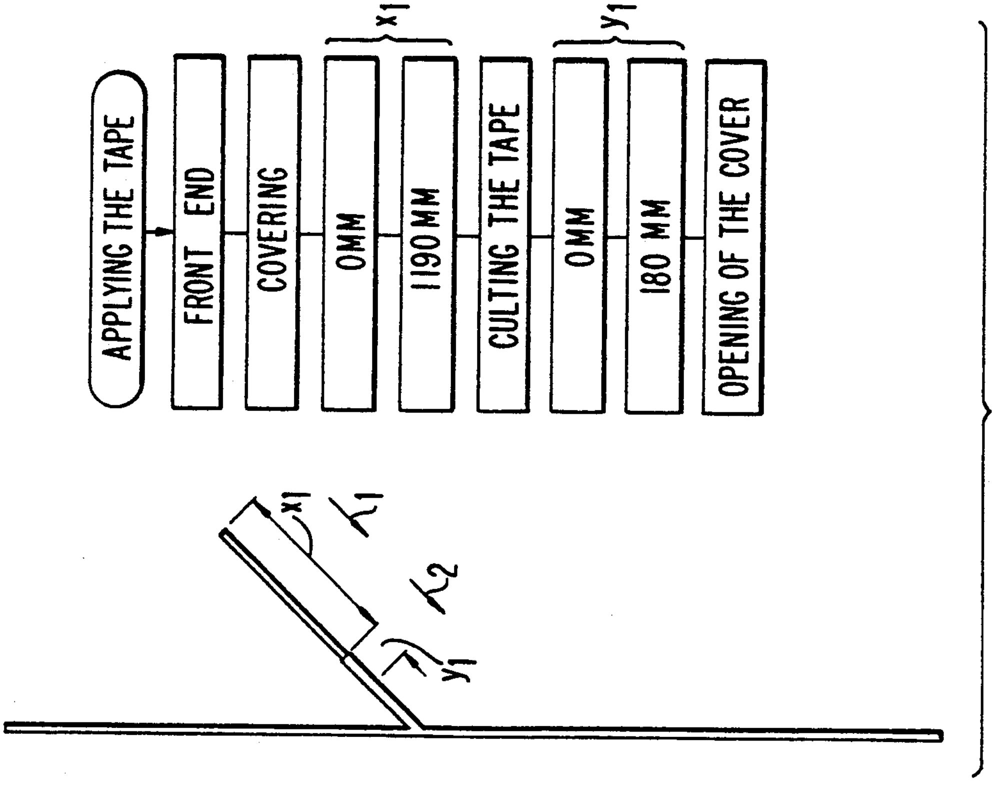
Figure 18:
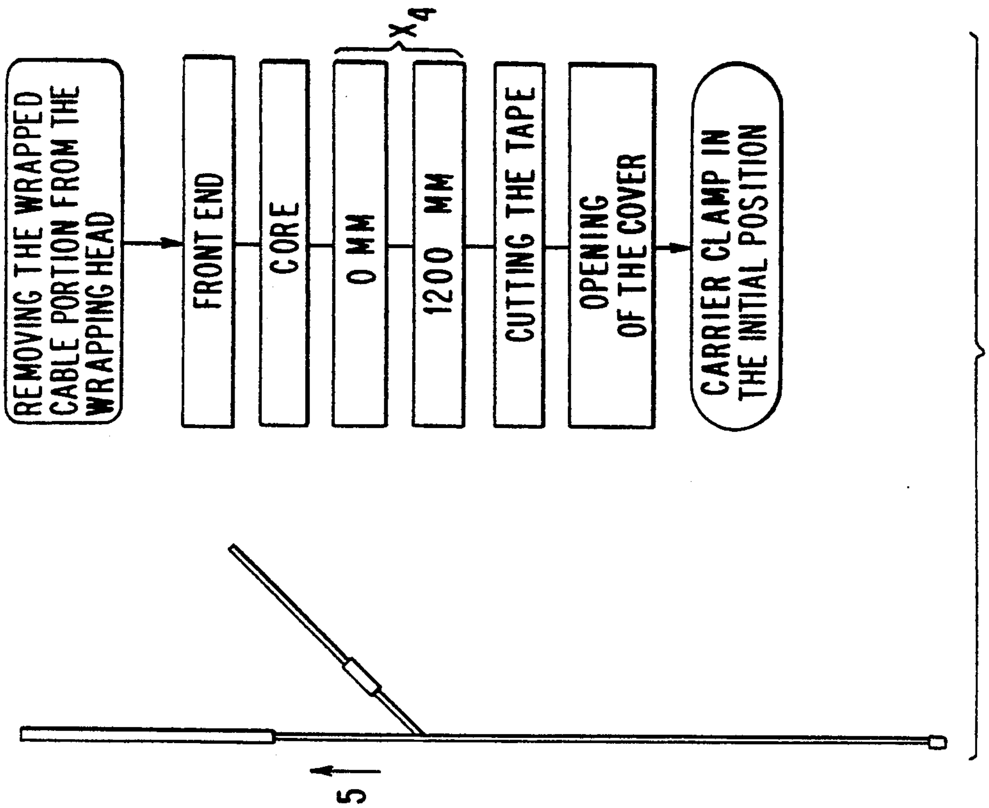
Figure 17:
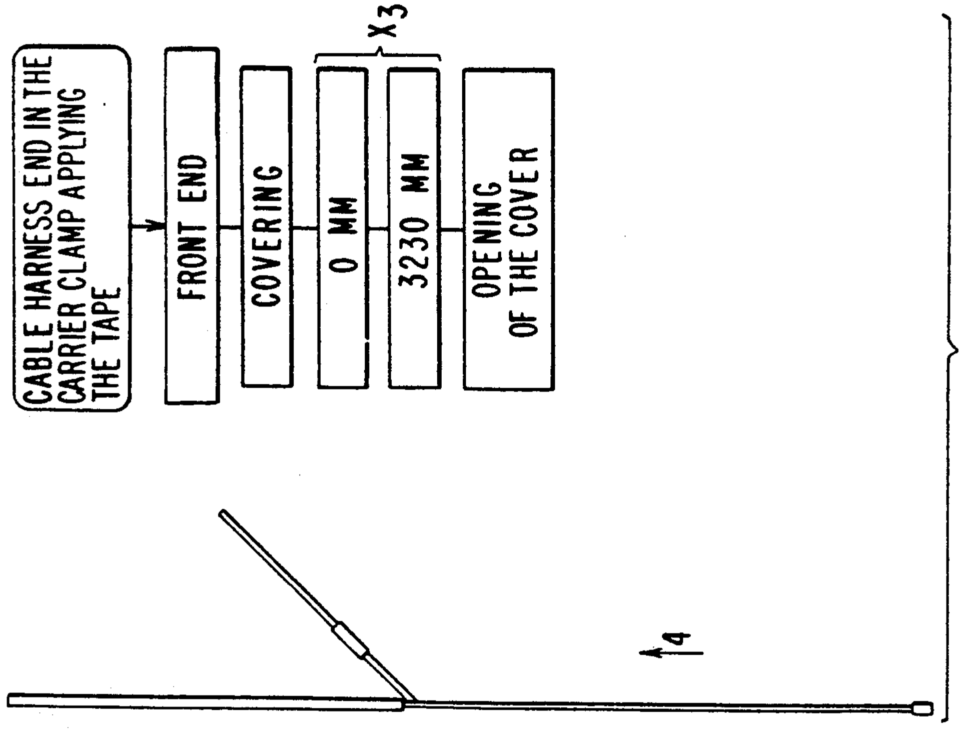
Figure 20:
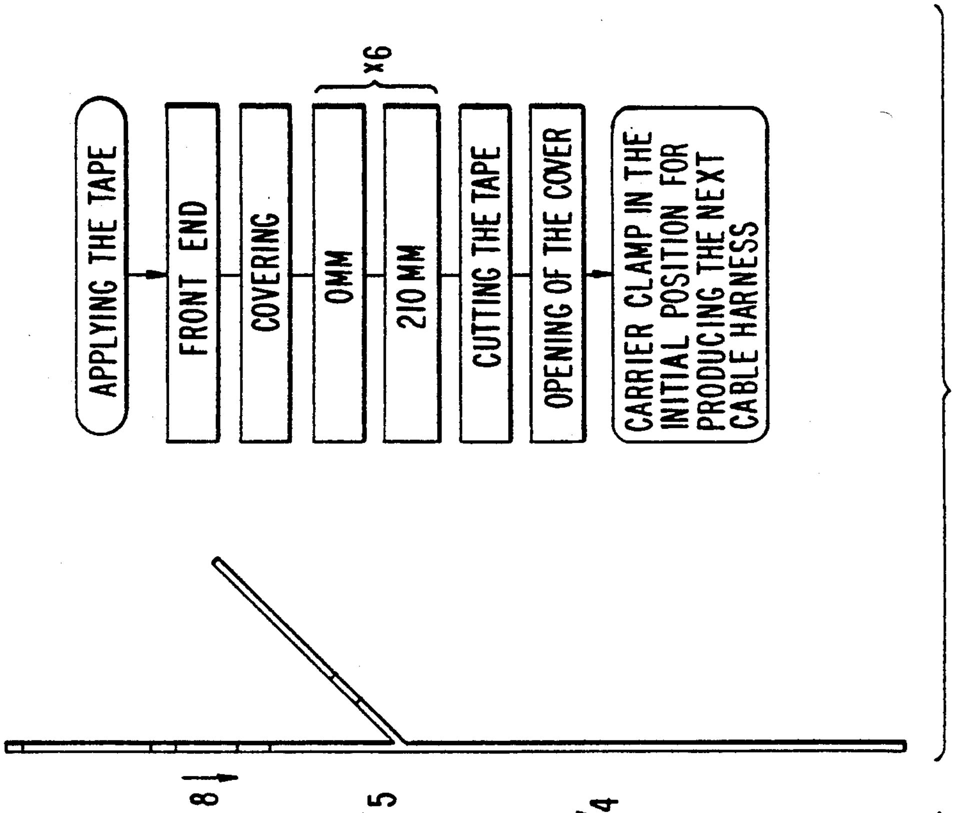
Figure 19:
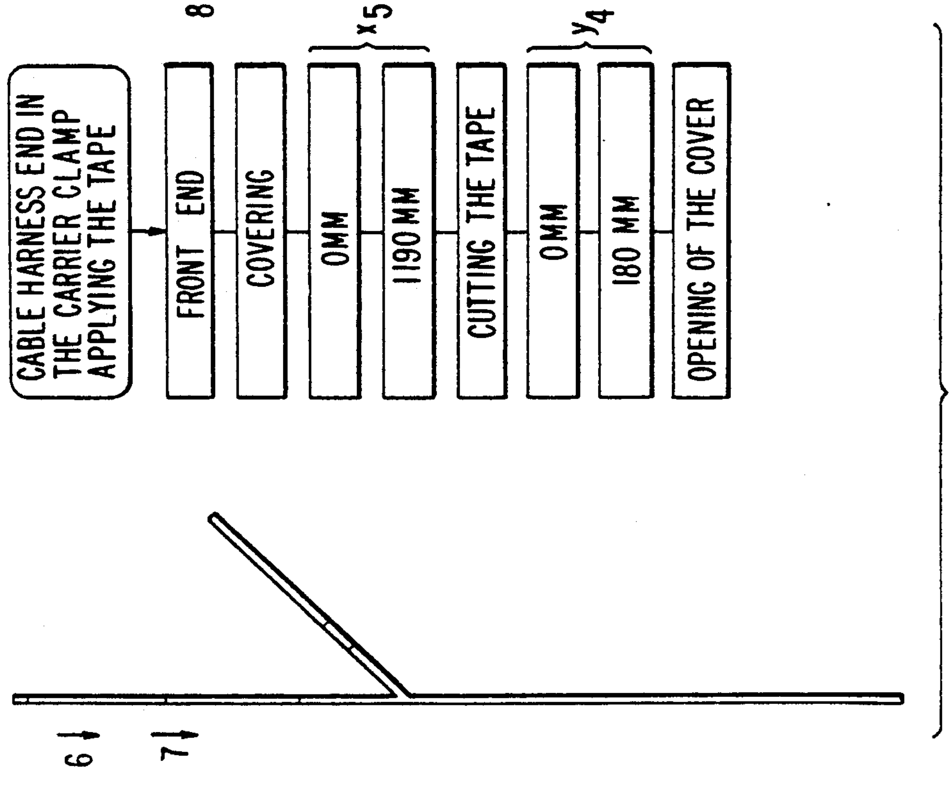

According to FIG. 15, the front end of a tape 21, which is adhesive on one side, is applied to the front end of the cable harness 55 in a first work step 1. After the wrapping wheel 12 has been protected by the protective cover (not shown), the wrapping process begins by displacing 0 mm and ends after a wrapped up length of 1190 mm ($=x_1$). The tape 21 is automatically cut by a tape cutting apparatus 16. In a second step 2, the cable harness 55 is moved in the direction of the arrow with a feed of 180 mm length ($=y_1$). The protective cover then opens automatically so that the start of the tape can be applied manually to the cable harness 55 (FIG. 16), so that the cable harness 55 is provided with a winding length of 210 mm ($=x_2$) in a third step 3 after closing the protective cover. After the automatic cutting of the tape 21, the protective cover opens automatically. A carrier clamp (holding device 9) is put in an initial position in order to secure the cable harness front or rear end, respectively, with the carrier clamp (FIG. 17). This is followed by work steps 6 to 8 according to FIGS. 17 to 20. The steps 6–8 are in many aspects similar to steps 1–5, and their programming should be clear from FIGS. 17–20. After the cable harness end is secured in the clamp, the tape is applied to the end and further wrapping takes place. After wrapping length reaches 2320 ram, the cover is opened, and the wrapped cable length reaches 2320 mm, the cover is opened, and the wrapped cable branch is removed from the wrapping head, and the wrapping operation continues according to program steps shown in FIGS. 18–20.

It is believed that all program steps should be clear from the block diagrams of FIGS. 15–20.

Hereinbelow programming steps for cable tree of FIG. 14 are presented.

Programming steps for cable tree (FIG. 14)

| Step | Operation/Display | |
|---|---|---|
| 1 | Marker | step 1 |
| 2 | Safety cover | open |
| 3 | Position (mm) | 00 |
| 4 | Holding device | close |
| 5 | Start | |
| 6 | Revolutions per minute | 880 |
| 7 | Feeding (mm per revol.) | 10 |
| 8 | Binding length (mm) | 1190 ($x_1$) |
| 9 | Cutting | |
| 10 | Marker | step 10 |
| 11 | Feeding length (mm) without binding | 180 ($y_1$) |
| 12 | Safety cover | open |
| 13 | Start | |
| 14 | Marker | step 14 |
| 15 | Revolutions per minute | 800 |
| 16 | Feeding (mm per revol.) | 10 |
| 17 | Binding length (mm) | 210 ($x_2$) |
| 18 | Cutting | |
| 19 | Safety cover | open |
| 20 | Rolls | open |
| 21 | Marker | step 21 |
| 22 | Position (mm) | 20 ($y_2$) |
| 23 | Holding device | close |
| 24 | Start | |
| 25 | Revolutions per minute | |
| 26 | Feeding (mm per revol.) | 10 |
| 27 | Binding length (mm) | 3230 ($x_3$) |

-continued

| Programming steps for cable tree (FIG. 14) | | |
|---|---|---|
| Step | Operation/Display | |
| 28 | Safety cover | open |
| 29 | Start | |
| 30 | Marker | step 30 |
| 31 | Revolutions per minute | 800 |
| 32 | Binding length (mm) | 1200 ($x_4$) |
| 33 | Cutting | |
| 34 | Safety cover | open |
| 35 | Rolls | open |
| 36 | Marker | step 36 |
| 37 | Position (mm) | 00 |
| 38 | Holding device | close |
| 39 | Start | |
| 40 | Revolutions per minute | 800 |
| 41 | Feeding (mm per revol.) | 10 |
| 42 | Feeding length (mm) without binding | 180 ($y_4$) |
| 43 | Safety cover | open |
| 44 | Start | |
| 45 | Marker | step 47 |
| 46 | Revolutions per minute | 200 |
| 47 | Feeding (mm per revol.) | 200 |
| 48 | Binding length (mm) | 225 ($x_6$) |
| 49 | Cutting | |
| 50 | Safety cover | open |
| 51 | Rolls | open |
| 52 | Go to step 1 | |

The control of the apparatus according to the invention should be clear from FIG. 21. The control device controls operation of the winding wheel motor 53 and the roll drive motor 23 in accordance with an output of the electric speed generator 10'.

The control device 21 of FIG. 21 contains user-I/O, CPU, memory, winding wheel drive control, feed drive control, position control and apparatus mechanism −I/O and serves for logical running of all movement steps of the apparatus 1 by means of CPU and memory. For obtaining a keyboard 4, a display 5 and floppy 3 are provided, which are connected with user-I/O. An apparatus and mechanism −I/O is connected with airvalves which are limited externally by limit switches. The winding wheel drive control serves for controlling the winding wheel drive motor 53 which drives a controlling electric speed generator 54. The feed drive control controls a motor 23, which drives the roll 11 and the electric speed generator 11'. Roll 10 drives the length measured generator 10' and is connected with the position control. Also the length measured generator 25' is connected with the position control (see FIG. 22 and description). The positioning mechanism for the rollers 10 and 11 and the carriage and holding device control are not shown in the drawings.

FIG. 22 illustrates the control of the set point/control point. When the length of the objects 20 to be bound is not longer than the maximum path U of the carriage 8, the axial point of the object 20 is performed exclusively by the holding device 9 (holding device). FIG. 21 shows the starting position of the binding. The carriage 8 is provided with a length measuring pickup 25' which communicates with a stationary displacement length scale 25 arranged parallel to the movement axis of the carriage 8. The displacement length scale 25 can be formed for example as an optical scale with a millimeter marking and the length measuring pickup 25' can be provided as an optical sensor. The sensor can be formed as an electronic reading pin (with built-in light source) and produce counting pulses per millimeter marking line. In the binding start position the length measuring pickup 25' is positioned at the length initial point $S_0$. The binding process starts by moving the carriage 8 in the direction of the arrow 60 and by turning the binding wheel 12. Simultaneously, the pulses, for example one pulse per millimeter of displacement path, are produced by the sensor (length measuring pickup 25') and they are counted in a pulse counter 61 with a control value. In a comparator 62 the counter state (for example counter state 700=700 mm) provided as a set value in a memory 63 is continuously compared with the counter 61. After the carriage 12 is moved with the start of the object 20 from the region of both rollers 10, 11, the rollers 10, 11 cooperate together when the holding device comes out from the region of the rollers 10, 11, so that they are in pressure contact with the object 20 (the rollers 10, 11 in this position are not driven, but, instead, are freely rotatable to firmly hold the object for joint rotation)and thereby during binding a turning of the object 20 is prevented in an advantageous manner (as disclosed on page 1 and on page 4, last paragraph of the specification). When the predetermined binding length ($P_0$ to $P_1$=700 mm) at the point $P_1$ with the counter state 700 is obtained the comparator 62 produces a stop signal 70 for stopping the carriage 8 and the winding wheel 12. Then the winding tape 21 is cut off by the tape cutting apparatus 16 and the binding process is finished.

If the length to be bound (for example 2,000 mm) of the object 20 is longer than the maximum path U (for example 1,000 mm) of the carriage 8, the process takes place to point $P_1$ as described hereinabove, however, the binding process is further performed. The carriage 8 moves to a stroke end point $P_2$ which is identified with a broken line, and this activates a switch 64 which is mechanically (see broken line 65) is connected with a changeover switch 66. Simultaneously the holding device 9 is opened by the switch 64 through a conductor 67 by a lifting cylinder 22 and the start of the object 20 is released. Simultaneously the control point pulse is switched over from the length measuring pickup 25' from a conductor 71 to the control point pulse of the length measuring pickup 10' of the upper roller 10 to a conductor 72. The both rollers 10, 11 take over the further transportation of the object 20 so that the lower roller 11 is driven while the upper roller 10 rotates with it. The control point pulses of the pickup 25' and the pickup 10' transmitted through a conductor 68 to the counter 61 are equally defined. In other words, for example a pulse of a displacement stroke of the object 20 corresponds to 1 mm. Correspondingly, the roller 11 with a circular ring-like scale 69 is provided with a millimeter marking. The binding process is performed until the counter condition "2000" (control point 2,000 mm) of the counter 61 of the predetermined counter condition 2,000 (nominal value of 2,000 mm) of the storage 63 is obtained, and then the stop signal 70 for the carriage 80 and the winding wheel 12 is released.

Figure 23:
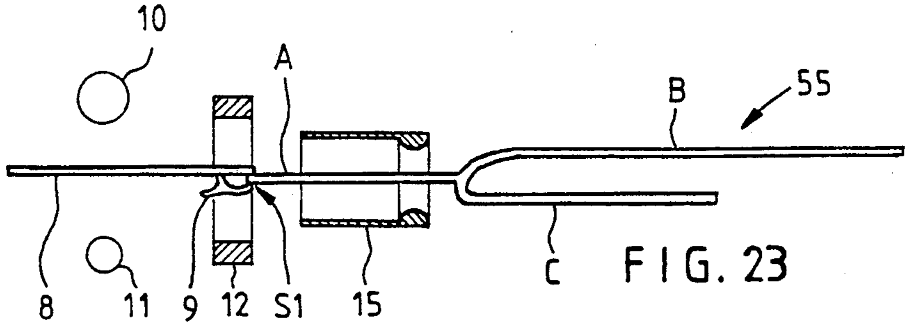
Figure 24:
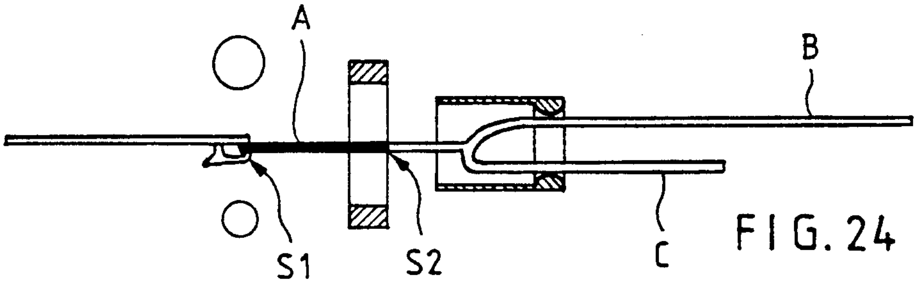

FIGS. 23-26 which relate to FIG. 14 with additional elements "S1 to S13" and the cable harness portions "A", "B" and "C". FIG. 23 shows a start position for binding. The free end of the cable harness portion "A" at the point S1 is manually connected with the holding device 9 of the carriage 8. This point S1 corresponds to the length of 0 mm. After an end of an adhesive tape 21 is placed at S1, the winding wheel 12 starts to rotate and simultaneously the carriage 8 pulls the cable harness 55. After a binding length of 1190 mm (equals x1/FIGS. 14 and 15) at point S2 the winding wheel 12 and the carriage 8 stop. Then the tape cutting is performed. This position is shown in FIG. 24.

Figure 25:
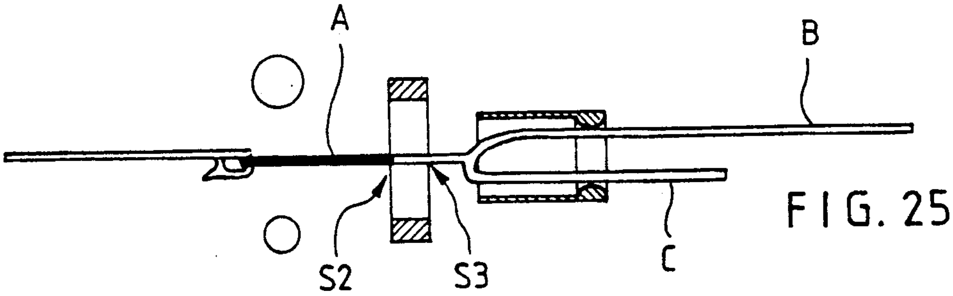
Figure 26:
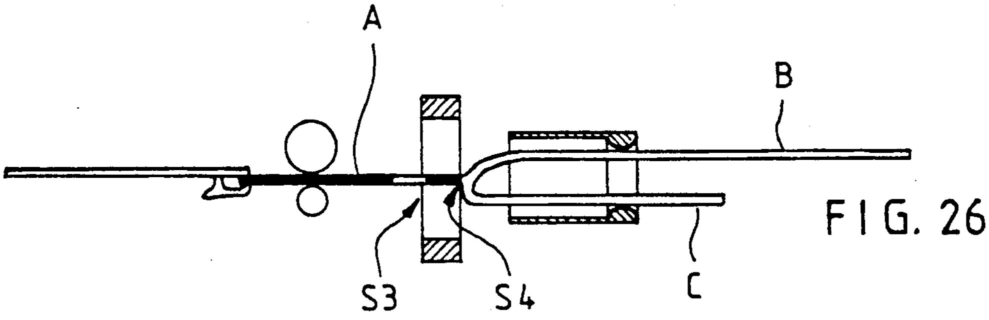

In a further step from S2 (equal 0 mm) to a S3 (equals 180 mm—y1) in accordance with FIG. 25, a transportation of the portion "A" by the carriage 8 is performed. After placing the tape at point S3 (equals 0 mm) in accordance with FIG. 25, the winding wheel 12 starts to rotate and simultaneously the carriage 8 pulls the portion "A" to S4. After the holding device 9 leaves the region of both opposite rollers 10, 11, both rollers 10, 11 cooperate so that a turning of the cable harness portion "A" is prevented. After the tape 21 is cut off, the binding process ends (from x2=210 mm) as shown in FIG. 26. After opening of the holding device 9 and withdrawal of the rollers 10, 11 from one another, the portion "A" is removed.

Figure 27:
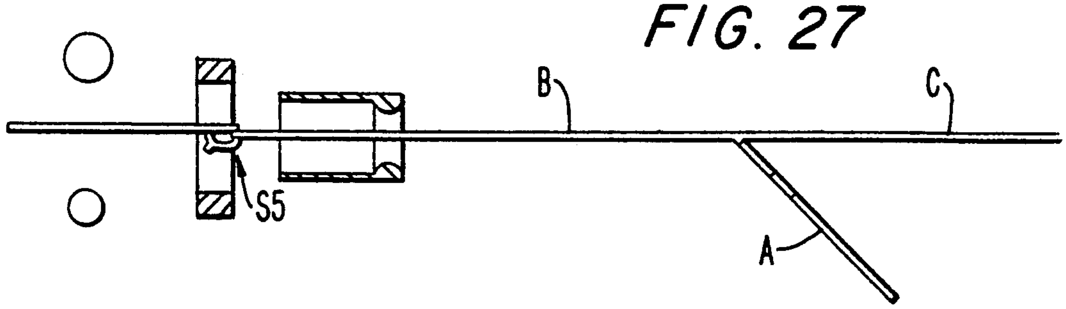
Figure 28:
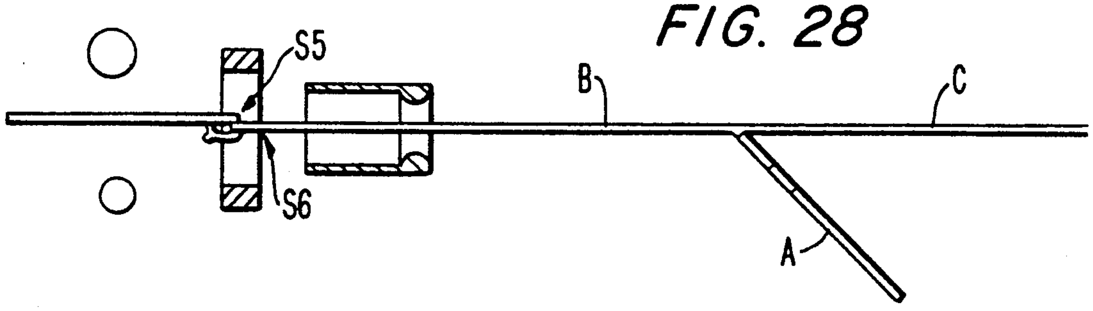
Figure 29:
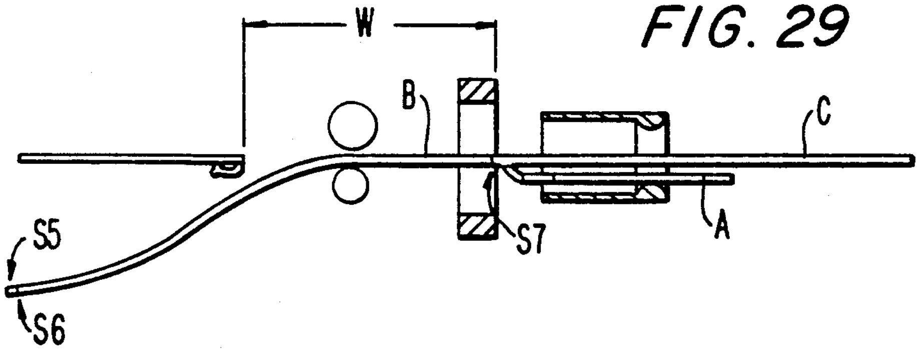
Figure 30:
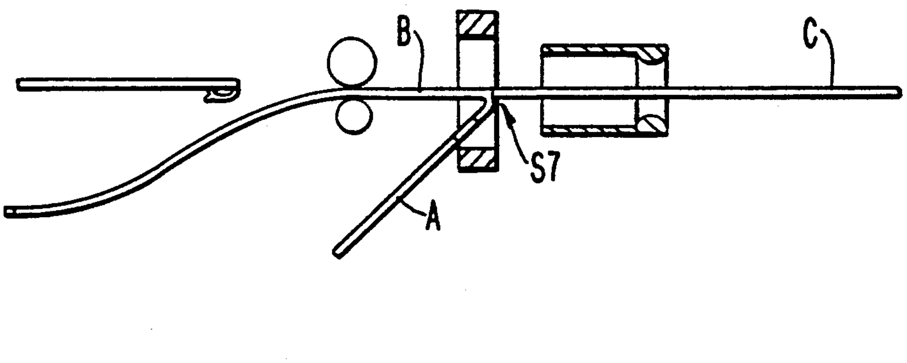

Now the cable harness portion "B" is connected with the holding device 9 at S5 as shown in FIG. 27. A transportation of the portion "B" by the carriage 8 is performed from S5 (equals 0 mm) to S6 (equals 20 mm—y2) as shown in FIG. 28. After placing the tape at S6 (equals 0 mm) in accordance with FIG. 28, the winding wheel 12 starts to rotate and simultaneously the carriage 8 pulls the portion "B". After the maximum path w of the holding device 9 and correspondingly the carriage 8 is reached, the rollers 10, 11 take over the further transportation or in other words the further pulling of the portion "B". Simultaneously, the holding device 9 opens and the portion 8 falls downwardly. After ending the bounding process at S7 (equals x3 equals 3230 mm) in accordance with FIG. 9 the portion "A" is pulled in the supply passage 15 is manually withdrawn. This position is shown in FIG. 30.

Figure 31:
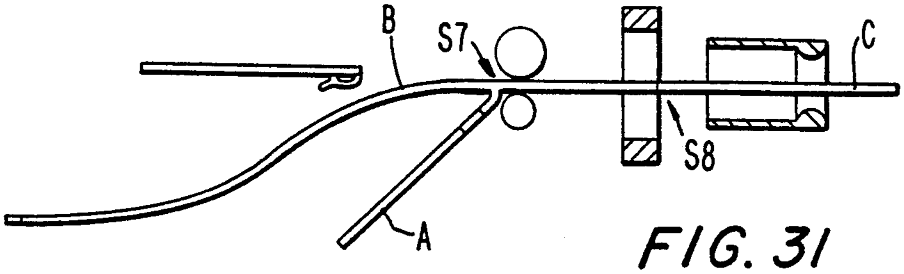
Figure 32:
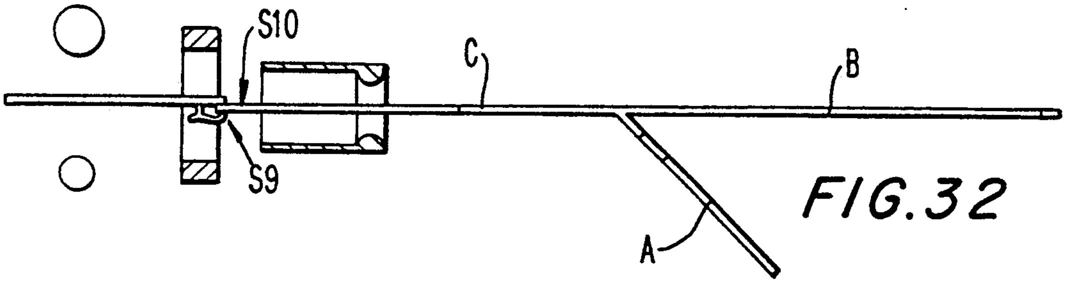
Figure 33:
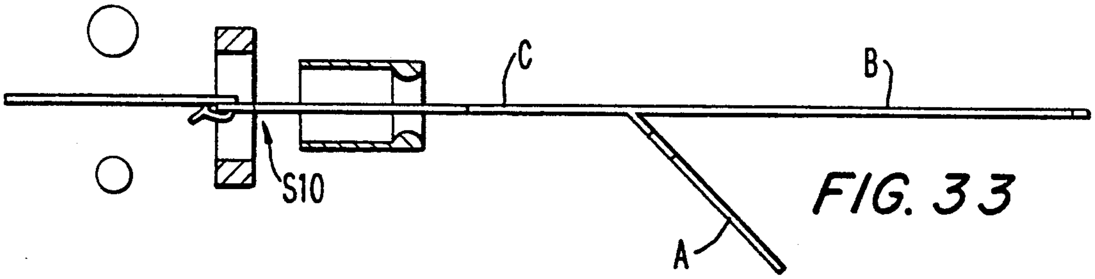
Figure 34:
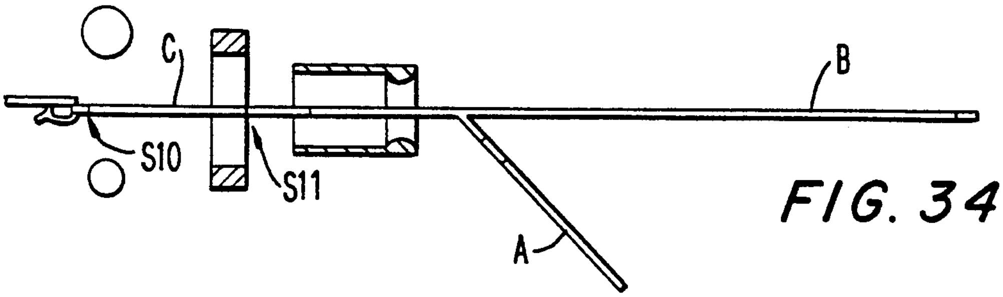
Figure 35:
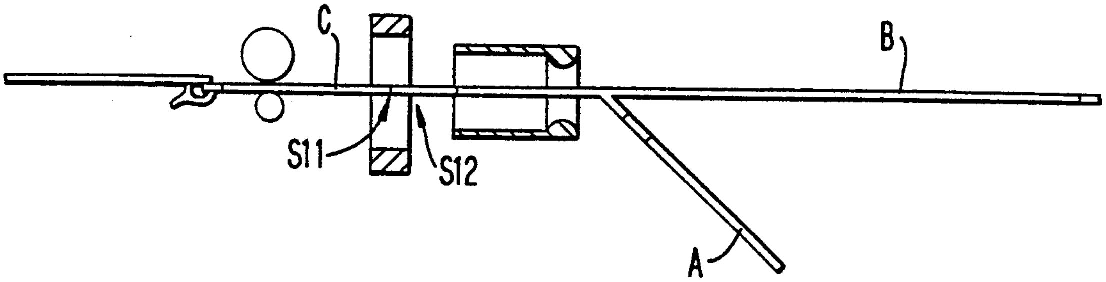
Figure 36:
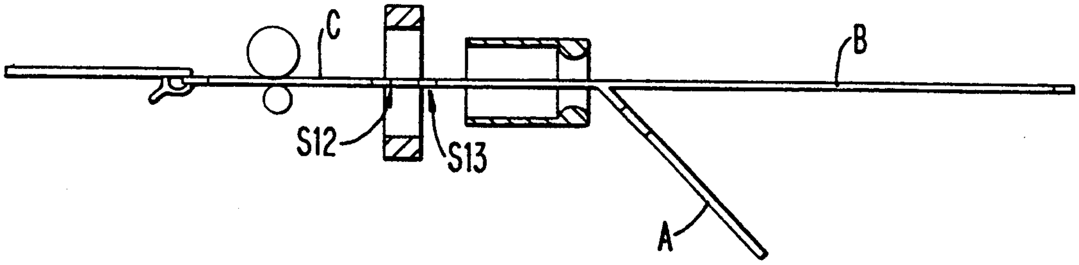

Then the further binding of the last portion "C" starts from S7 (equals 0 mm—FIG. 30) to S8 (equals 1,200 mm equals x4—FIG. 31) starts. After the tape cutting end moving apart from one another of the rollers 10, 11 the cable harness 51 is removed and then the portion "C" with its free end is connected with the holding device 9 located in the starting position at S9 (equals 0 mm) as shown in FIG. 32. Then in accordance with FIG. 32 a transportation of the portion "C" is performed by the carriage 8 from S9 to S10 (equals y3). After placing the tape at the point S10 (equals 0 mm) in accordance with FIG. 3, the winding wheel 12 starts to rotate and simultaneously the carriage 8 pulls the portion "C" to S11 (equals 1190 mm equals x5—FIG. 34). After the tape cutting a transportation of the portion "C" by the carriage 8 is performed from S11 (equals 0 mm—FIG. 34) to S12 (equals 180 mm equals y4—FIG. 35). After the holding device 9 leaves the region of the rollers 10, 11, the rollers 10, 11 move toward one another as described hereinabove. After the tape placing at S12 (equals 0 mm) in accordance with FIG. 35, the winding wheel 12 starts to rotate and simultaneously the carriage 8 pulls the portion "C" to S13 (equals 225 mm equals x6—FIG. 36). After cutting the tape the holding device 9 opens and the winding wheel 12 stops. The finally bound cable harness 55 can be removed. It should be mentioned that the roller 10 is switched to the length measurement when the maximum path U of the holding device 9 is reached.

It will be understood that each of the elements described above, or two or more together, may also find a useful application in other types of constructions differing from the types described above.

While the invention has been illustrated and described as embodied in an apparatus for wrapping flexible, elongate objects, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for wrapping up flexible elongate objects comprising a wrapping wheel arranged coaxially to a longitudinal axis of the objects and having a tape spool support movable therewith, drive means with a roller drive for advancing the objects and arranged at one side of the wrapping wheel, the drive means also including a carriage movable parallel to an axis of rotation of the wrapping wheel and to the longitudinal axis of the objects, respectively, and including a holding device on the wrapping wheel side of said carriage for holding an end of an object for pulling the object through the wrapping wheel, the drive means further including two vertically displaceable rolls which for a start of the wrapping are positioned relative to one another so far that the holding device is movable between the rolls to the wrapping wheel, said rolls being arranged vertically one above the other and oriented with their axes of rotation transversely relative to the longitudinal axis of the objects, and an electric program control for controlling a drive length wherein one roll is provided with a length detecting means and the other roll is driven from an external power source, the operation of said drive rolls being synchronized with said carriage movement so that when said carriage has advanced a predetermined distance, said holding device is disengaged from said object and said rolls are moved together to engage and further advance said object through said wrapping wheel.

2. An apparatus according to claim 1, wherein the rolls are arranged in the vicinity of the wrapping wheel.

3. An apparatus according to claim 2, wherein the feed carriage is provided with a displacement pickup drive.

4. An apparatus according to claim 1, wherein the control includes weans for activating the roll feed drive and for disengaging the end of the objects from the holding device.

5. An apparatus according to claim 1, wherein the tape spool support is provided with a tape supply control device.

6. An apparatus according to claim 5 wherein the control includes a device for detecting the minimum tape spool diameter and for stopping the wrapping process when a preset minimum tape spool diameter is reached.

7. An apparatus according to claim 5, wherein the tape supply control device includes a lever mechanism for detecting the minimum diameter of the tape spool.

8. An apparatus according to claim 5, wherein the tape supply control device includes a light barrier for detecting the minimum diameter of the tape spool.

9. An apparatus according to claim 1, further comprising tape cutting device.

10. An apparatus according to claim 9, wherein the tape cutting device has a slot for receiving the tape to be cut-off and includes a rotatable cutter which is oriented at a right angle relative to a direction of tape displacement.

11. An apparatus according to claim 2, further comprising drive means for displacing said feed carriage in accordance with an output of a displacement pick up.

* * * * *